Sept. 17, 1929.  G. A. BIGGS  1,728,719
GATE ADJUSTING MEANS FOR TURBINES AND THE LIKE
Filed June 8, 1927   2 Sheets-Sheet 1

INVENTOR.
GEORGE A. BIGGS
BY
ATTORNEYS.

Patented Sept. 17, 1929

1,728,719

UNITED STATES PATENT OFFICE

GEORGE A. BIGGS, OF ORANGE, MASSACHUSETTS, ASSIGNOR TO RODNEY HUNT MACHINE COMPANY, OF ORANGE, MASSACHUSETTS, A CORPORATION OF MASSACHUSETTS

GATE-ADJUSTING MEANS FOR TURBINES AND THE LIKE

Application filed June 8, 1927. Serial No. 197,478.

This invention relates to turbines, rotary and centrifugal pumps, and blowers of the kind generally used in connection with fluids, gases and vapors.

The objects of my invention are to provide a turbine having a gate operating ring supported on a seat protected from sand or other abrasive substances held in suspension by the fluid; to provide a turbine that will maintain an improved running joint between the gate operating ring and the seat upon which it is supported when operated in fluids containing abrasive matter; to provide a turbine in which the gate operating ring will work freely and not become jammed by foreign substances becoming lodged in the running joint; to provide a turbine having a gate operating ring and a seat supporting it which can be kept lubricated more satisfactorily than in the old constructions; to provide a turbine in which the gate operating ring can be operated with a relatively small amount of energy; to provide a turbine in which the substance for lubricating the seat of the gate ring cannot escape by gravity when operated in a fluid having a higher specific gravity than the lubricating substance; to eliminate expensive construction, such as is known as exposed or outside gate mechanism which is intended to prevent wear of the gate operating ring; to provide a turbine in which the gates will be in uniform relation to each other at different stages of the gate opening; and to provide a turbine in which the joint between the gate ring and its bearing will not corrode.

Reference is to be had to the accompanying drawings which show a typical application of my invention, and in which—

Figure 1:
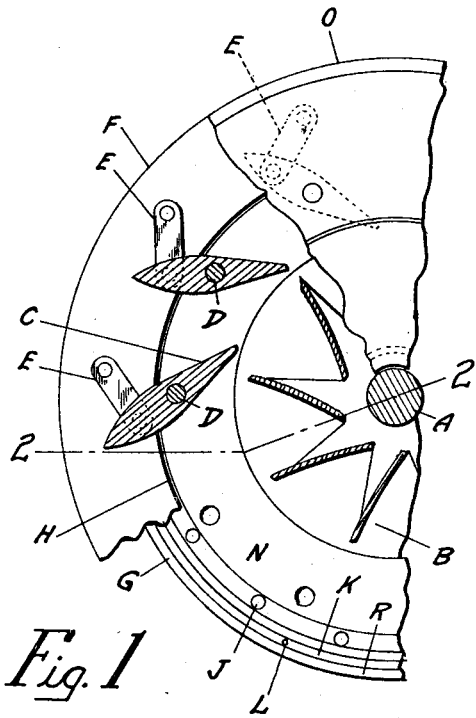
Fig. 1 is a plan, partly in cross section on the line 1—1 of Fig. 2 through half of a turbine showing the gate operating ring located on the base of the turbine gate case.
Figure 2:
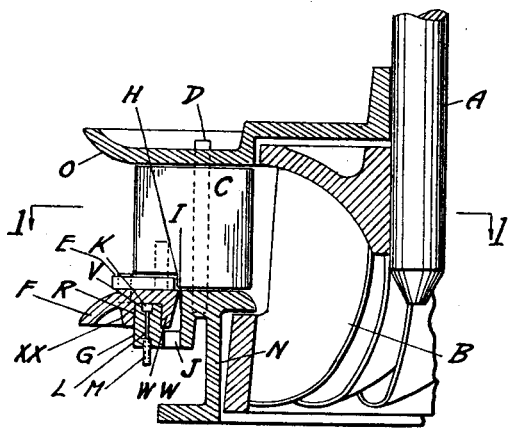
Fig. 2 is a radial cross section on the line 2—2 of Fig. 1 through the same turbine.
Figure 3:
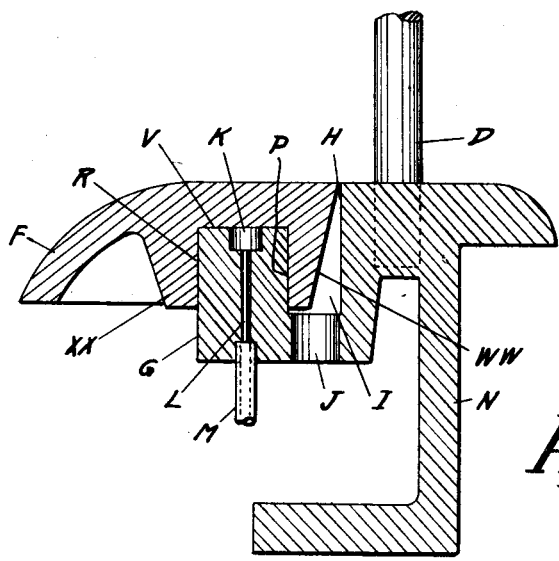
Fig. 3 is an enlarged radial sectional view of the lower part of the turbine gate case.

In Figs 1, 2 and 3 the turbine shaft A has mounted upon it the runner B. The runner is surrounded by a gate casing consisting of a crown plate O and a base N. Between the inner surfaces of these members movable gates C are mounted on pivots D. Each gate is connected to the gate operating ring F by a link E. The ring can be turned a little to the right or left about the axis of the turbine as a center to change the position of all the gates. This may be turned in any desired manner. The invention can be applied to any design of turbine in which the gates are operated from a ring or any member equivalent to a gate ring which has a rotary movement around the axis of the turbine when opening or closing the gates.

In many turbine installations it is cheaper and better to employ a design in which the gate operating ring is located in the fluid. Heretofore in designs of this kind the gate operating ring has been mounted in such a way that the joint between the ring and the seat upon which it is supported is exposed and not adequately protected from abrasive substances that may be held in suspension in the fluid. The result is that the unprotected joint becomes filled with abrasive substance which wears the bearing and gradually increases the clearance between the ring and seat due to the operation of the ring. Furthermore when the joint becomes filled with foreign substance, such as sand or grit, the ring works harder and under certain conditions may become jammed, requiring an undue amount of energy to move it at all. Furthermore it has not heretofore been possible to lubricate the bearing supporting the gate operating ring satisfactorily because the open joint allows the lubricating substance to escape. Heretofore in order to guard against these difficulties, the turbines have been built with outside or exposed type of gate mechanism which is very expensive to build. By my invention all these difficulties are effectively and entirely eliminated as will appear in the following description.

An annular rim G forms an integral part of the base N. The rim supports the operating ring F which is free to rotate either forward or backward. The running joint between the ring and the base is at the top and vertical sides of the rim as shown at R, V and P. There is an annular groove K for grease or any lubricating substance which may be injected into the groove through a suitable pipe connection M and the hole L. The grease which is injected may be forced entirely around the full circumference of the groove so that the ring F is lifted off its seat a sufficient amount to allow the grease to spread out over the entire surface of the seat V and into the clearance space along the vertical sides of the rim R and P. There is a clearance space at H between the inner diameter of the ring F and the base casting N which space is narrower at the top H than at I. This is so that particles of foreign matter that may enter the space at H may drop downward more freely and out of the space I through holes J. The holes J also serve as passageways for the fluid so that practically the same pressure of fluid is maintained in the space I as outside. Therefore there is no tendency for the fluid to flow upward at high velocity through the running joint on the outside of the rim, across the seat and downward on the inside surface. It is desirable to prevent such a flow of fluid through the running joint as it would have a tendency to wash away the lubricating substances.

One of the important features of construction of the gate ring is embodied in the sides WW and XX. These sides extend downward all around and cover and enclose the surfaces forming the bearing on the rim G. They are parallel or substantially parallel with the axis of the turbine. When grease or oil is injected into the bearing joint of the gate ring F the natural tendency of the grease or oil is to flow upward because the turbine is entirely surrounded by water and the specific gravity of the grease or oil is less than water. On account of the same principle, the grease or oil along the bearing joints at R and P has a tendency to rise rather than flow downward so that the grease or oil is retained in the joint as long as it is surrounded by a fluid whose specific gravity is greater than the substances used for lubricating purposes. By keeping the joint lubricated, it will be easier to operate than if it rested on an unlubricated surface. Also the grease or oil used for lubrication will protect the joint from rust and corrosion. Furthermore, from the location of the joint relative to the current of the fluid and according to the manner in which it is protected, it is not possible for sand or other abrasive substance to enter the joint as is otherwise the case in existing designs where the joint is open to the gate space and where sand can settle and enter the joint.

The gate operating ring F has, in reality, an annular groove which is formed in the ring itself by the three sides R, V and P. The drawings show the sides R and P as being parallel with the axis of the turbine and the other side or bottom of the groove V at right angles to the axis.

Figure 4:
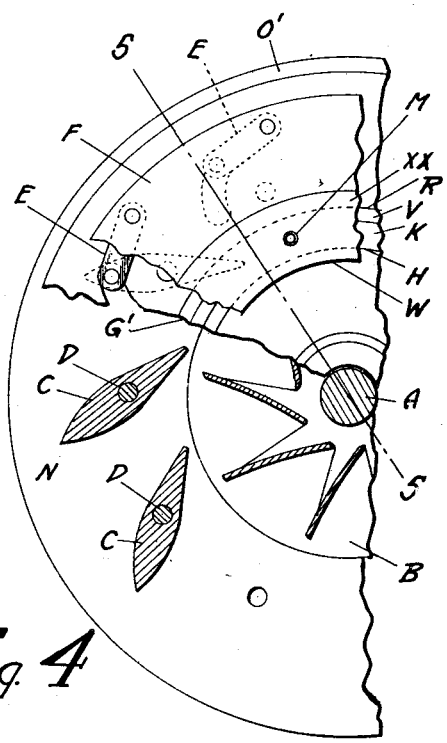
Fig. 4 is a plan and section of half of a turbine of modified form in which the gate operating ring is located on top of the turbine gate case.
Figure 5:
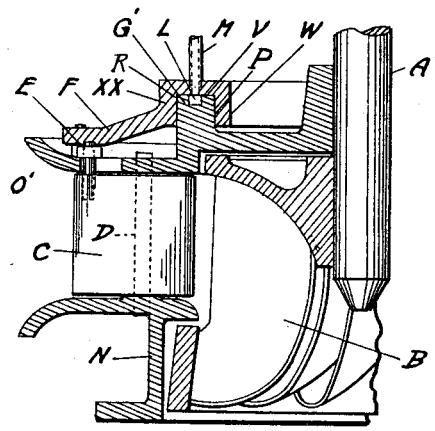
Fig. 5 is a cross section on the line 5—5 of Fig. 4 thereof.
Figure 6:
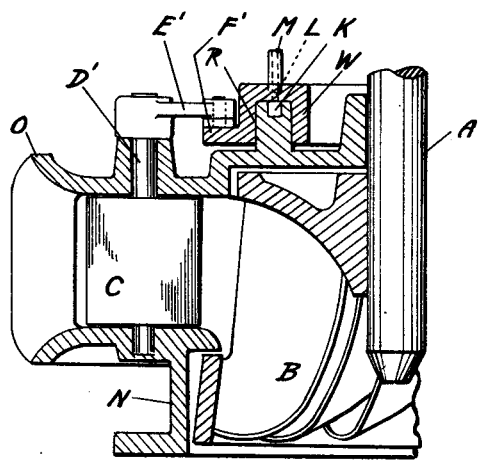
Fig. 6 is a view similar to Fig. 3 of an application of the invention to a turbine of outside gate mechanism type in which the gate ring is located on top of the gate casing.

In the form shown in Figs. 4 and 5 and also in the form shown in Fig. 6, the same letters represent the same or corresponding parts. But here the annular rim G' is located at the top of the crown plate O' to support the gate operating ring F. The latter is located at the top of the turbine gate case. All other conditions are the same as in the form shown in the first three figures.

Fig. 6, in a similar way, shows how the invention can be applied to that type of turbine having an outside gate mechanism. Here the pivots D' extend upwardly and the links E' lie over the top of the ring F' where they are exposed.

It will be seen that by the provision of the features which have been described, the gate operating ring is supported on the rim in such a way that it can have no radial or side play and it will rest down on its seat by gravity. At the same time the seat on which it rests is fully protected from sand or other abrasive substances in the fluid in which the turbine works. Also this seat or bearing, on account of the fact that it constitutes a pocket in cross section with the sides opening downwardly, will retain a lubricant which is lighter than the fluid in which the turbine works. Gravity will act to hold the lubricant up against the running bearing surface and prevent its flowing down away therefrom. This arrangement permits the ring to work freely on account of the elimination of foreign substances, permits of lubrication which will remain in place, and provides an operating ring that can be turned by the expenditure of a very small amount of energy. Also it is an inexpensive construction and the amount of wear and therefore repairs is reduced.

Although I have illustrated and described three forms of the invention I am aware of the fact that changes can be made therein by any person skilled in the art without departing from the scope of the invention as expressed in the claims.

Therefore I do not wish to be limited to the exact form shown, but what I do claim is:—

1. In a turbine the combination of a gate ring with a bearing enclosed on three sides, two of which are substantially parallel with the axis of the turbine.

2. In a turbine the combination of a gate ring with a bearing at the bottom enclosed on three sides, two of which are axial and the third at right angles to the axis.

3. In a turbine, a gate ring having a groove for supporting the ring radially with respect to the turbine axis, said groove having two sides substantially parallel with the axis of the turbine.

4. In a turbine, a gate ring having a groove supporting the ring radially, said groove having two sides substantially parallel with the axis of the turbine, and a rim forming a part of the turbine on which said ring is supported axially by the bottom of the groove resting thereon.

5. A turbine having a gate ring provided with a groove in its bottom surface having one side substantially cylindrical and parallel with the axis of the turbine for supporting the ring radially.

6. A turbine having a gate ring provided with a groove in its bottom surface having one side substantially cylindrical and parallel with the axis of the turbine for supporting the ring radially.

7. In a turbine, the combination with the turbine gates, of a ring for imparting motion to said gates, said ring operating in a plane at right angles to the axis of the turbine, a groove being formed in the ring itself, the bottom of said groove being of a flat annular configuration, and the sides of the groove being substantially cylindrical.

8. In a turbine, the combination of a base and a gate operating ring, the radial clearance space between said base and said ring being greater at the top than at the bottom of said ring.

9. In a turbine, the combination with a base having a groove around it on top and an annular rim beyond the groove, of a gate operating ring having a groove in its bottom into which the rim projects and fitting it to constitute a bearing therefor, the inner edge of the ring being spaced slightly from the inner wall of the groove in the base to allow liquid to flow down through the space thus formed.

10. In a turbine, the combination with a base having a groove around it on top and an annular rim beyond the groove, of a gate operating ring having a groove in its bottom into which the rim projects and fitting it to constitute a bearing therefor, the inner edge of the ring being spaced from the inner wall of the groove in the base, said space widening out below, and means for allowing the liquid to pass out of the groove in the base.

11. In a turbine, the combination with the gates and a ring oscillatable on the axis of the turbine for operating the gates, and a supporting bearing for the ring, the ring having a groove in the bottom for receiving the bearing and constituting a downwardly opening pocket for trapping a lubricant therein and preventing its escape by passing upwardly in a heavier liquid.

In testimony whereof I have hereunto affixed my signature.

GEORGE A. BIGGS.